(12) United States Patent
Kito

(10) Patent No.: US 8,975,677 B2
(45) Date of Patent: Mar. 10, 2015

(54) DECOUPLING CAPACITOR CELL, CELL-BASED IC, CELL-BASED IC LAYOUT SYSTEM AND METHOD, AND PORTABLE DEVICE

(71) Applicant: Yoshiharu Kito, Kyoto (JP)

(72) Inventor: Yoshiharu Kito, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 70 days.

(21) Appl. No.: 13/848,923

(22) Filed: Mar. 22, 2013

(65) Prior Publication Data
US 2013/0248957 A1    Sep. 26, 2013

(30) Foreign Application Priority Data
Mar. 23, 2012  (JP) .................. 2012-66844

(51) Int. Cl.
| | |
|---|---|
| H01L 27/108 | (2006.01) |
| H01L 27/07 | (2006.01) |
| G06F 17/50 | (2006.01) |
| H01L 27/02 | (2006.01) |
| H01L 29/94 | (2006.01) |
| H01L 27/118 | (2006.01) |
| H01L 49/02 | (2006.01) |

(52) U.S. Cl.
CPC ........ *H01L 27/0733* (2013.01); *G06F 17/5072* (2013.01); *H01L 27/0207* (2013.01); *H01L 29/94* (2013.01); *H01L 27/11803* (2013.01); *H01L 28/40* (2013.01)
USPC ........... 257/296; 257/300; 257/307; 257/528; 257/532

(58) Field of Classification Search
USPC .......................... 257/296, 300, 307, 528, 532
See application file for complete search history.

(56) References Cited

U.S. PATENT DOCUMENTS

| | | | |
|---|---|---|---|
| 5,631,492 A | 5/1997 | Ramus et al. | |
| 6,385,033 B1 | 5/2002 | Javanifard et al. | |

FOREIGN PATENT DOCUMENTS

JP    2005-150639    6/2005

*Primary Examiner* — Tan N Tran
(74) *Attorney, Agent, or Firm* — Fish & Richardson P.C.

(57) ABSTRACT

A decoupling capacitor cell includes: a first decoupling capacitor formed by only a pMOS transistor; and a second decoupling capacitor formed by two metal layers. The decoupling capacitor cell is arranged in an unused region not occupied by basic cells in a cell-based IC and is connected to a power wiring and a ground wiring.

10 Claims, 16 Drawing Sheets

DECOUPLING CAPACITOR CELL, CELL-BASED IC, CELL-BASED IC LAYOUT SYSTEM AND METHOD, AND PORTABLE DEVICE

CROSS-REFERENCE TO RELATED APPLICATION

This application is based upon and claims the benefit of priority from Japanese Patent Application No. 2012-66844, filed on Mar. 23, 2012, the entire contents of which are incorporated herein by reference.

TECHNICAL FIELD

The present disclosure relates to a decoupling capacitor cell, a cell-based IC (Integrated Circuit), a cell-based IC layout system and method, and a portable device. More particularly, some embodiments of the present disclosure relate to a decoupling capacitor cell, a cell-based IC, a cell-based IC layout system and method, and a portable device, which are capable of saving power and reducing ground noise while restricting power consumption.

BACKGROUND

A cell-based IC is a kind of ASIC (Application Specific Integrated Circuit). In other words, this is a semi-custom LSI (Large Scale Integrated) circuit to be designed and manufactured based on combinations of a variety of logic cells prepared as a library.

For example, the cell-based IC may be formed as an integrated circuit including a mixture of basic standard cells and large-scaled circuit blocks (mega cells or macro cells).

The cell-based IC implemented by the standard cells may include random logic.

A cell-based semi-custom design method has been conventionally employed for ASIC design.

This design method combines common intellectual property registered with a library and uses an automatic arrangement wiring tool to improve efficiency of IC design.

However, this design method has a problem of noise due to the compactness and high speed of cell-based ICs.

Specifically, in order to switch logic circuits in a cell-based IC at a high speed, there is a need to charge/discharge load capacitors connected to outputs of the logic circuits at a high speed. As a result, in switching of the logic circuits, very high pulse-like current flows into a power wiring or a ground wiring of the cell-based IC, and power or ground potential is greatly varied due to resistance and inductance of the power wiring or the ground wiring of the cell-based IC. Such potential variation may result in a low switching speed and circuit malfunction.

For the purpose of avoiding this problem, various methods of placing a decoupling capacitor (bypass condenser) between the power and ground wiring have been proposed.

In the related art, a decoupling MOS (Metal Oxide Semiconductor) capacitor cell using a CMOS (Complementary Metal Oxide Semiconductor) transistor has been employed as a decoupling capacitor inserted between the power wiring and the ground wiring. However, the decoupling MOS capacitor cell has its own disadvantage. The fining process may result in the thinness of the gate oxide film, which in turn causes insulation of a gate oxide film to be insufficient. Also, this may cause the increase in leak current and thus the increase in power consumption.

In particular, when using an nMOS transistor for a decoupling capacitor, leak current is about ten times as high as that of a pMOS transistor.

SUMMARY

The present disclosure provides some embodiments of a decoupling capacitor cell, a cell-based IC, a cell-based IC layout system and a layout method, which are capable of saving power and reducing ground noise while restricting power consumption.

According to one embodiment of the present disclosure, there is provided a decoupling capacitor cell including: a first decoupling capacitor formed by only a pMOS transistor; and a second decoupling capacitor formed by two metal layers, wherein the decoupling capacitor cell is arranged in an unused region not occupied by basic cells in a cell-based IC and is connected to a power wiring and a ground wiring.

According to another embodiment of the present disclosure, there is provided a cell-based IC including: a semiconductor substrate; a plurality of basic cells which is formed on the semiconductor substrate to have a plurality of semiconductor devices and internal wirings, and has a predetermined function provided by connecting the semiconductor devices using the internal wirings; a wiring region which is formed on the semiconductor substrate and has an external wiring to connect the basic cells; a ground wiring and a power wiring configured to supply power to the semiconductor devices; a first decoupling capacitor which is formed by only a pMOS transistor on the semiconductor substrate; and a second decoupling capacitor which is constituted by two metal layers formed on the semiconductor substrate, wherein a decoupling capacitor cell which is formed by the first and second decoupling capacitors is disposed in an unused region which is not occupied by the basic cells, and is connected to the power wiring and the ground wiring.

According to another embodiment of the present disclosure, there is provided a cell-based IC layout system for performing a layout of a cell-based IC using an information processing apparatus, including: an unused region extracting unit configured to extract an unused region not occupied by a basic cell in the cell-based IC under layout design; an insertion number calculating unit configured to calculate the number of decoupling capacitor cells to be inserted in the unused region, each decoupling capacitor cell including a first decoupling capacitors constituted by only a p-MOS transistor and a second decoupling capacitor constituted by a two-layered metal layer; and a decoupling capacitor cell inserting unit configured to insert the decoupling capacitor cells based on the calculated number.

According to another embodiment of the present disclosure, there is a cell-based IC layout method including: extracting an unused region not occupied by a basic cell; calculating the number of decoupling capacitor cells to be inserted in the unused region, each decoupling capacitor cell including a first decoupling capacitors constituted by only a p-MOS transistor and a second decoupling capacitor constituted by a two-layered metal layer; and inserting the decoupling capacitor cells in the unused region based on the calculated number.

DETAILED DESCRIPTION

Figure 1:
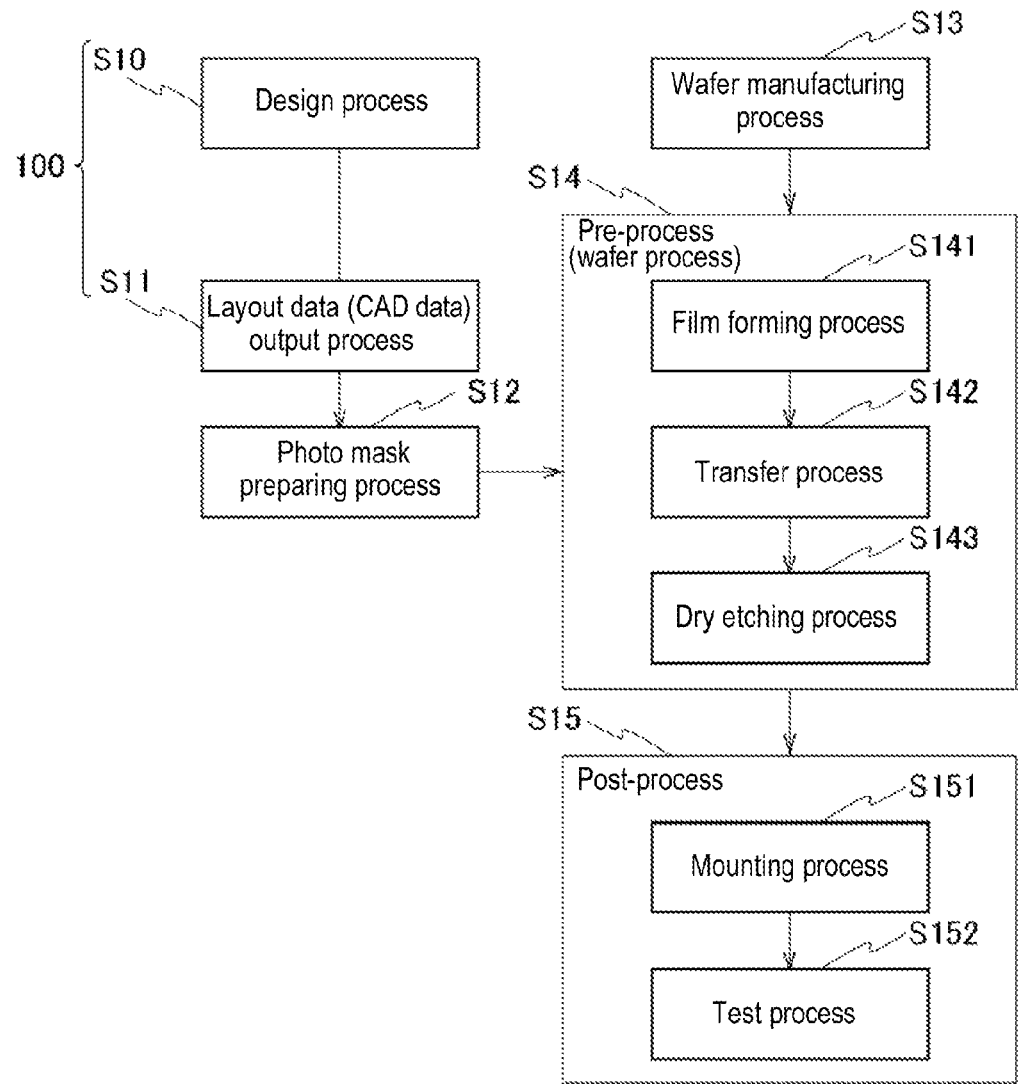
FIG. 1 is a flow diagram of a design and manufacturing method of a cell-based IC.

Embodiments of the present disclosure will hereinafter be described with reference to the drawings. In the drawings, the same or similar elements are denoted by the same or similar reference numerals. It is however noted that figures in the drawings are just schematic and a relationship between thickness and dimension of elements, a thickness ratio of layers and so on may be drawn opposed to the reality. Therefore, details of the thickness and dimension should be determined based on the following detailed description. In addition, it is to be understood that different figures in the drawings may have different dimension relationships and ratios.

The following embodiments provide devices and methods to embody the technical ideas of the present disclosure and material, shape, structure, arrangement and so on of elements in the disclosed embodiments are not limited to those specified in the following description. Various modifications to the embodiments of the present disclosure may be made without departing from the spirit and scope of the present disclosure which are defined by the claims.

EMBODIMENTS

Cell-Based IC Layout System

A cell-based IC layout system 100 according to an embodiment will now be described with reference to FIGS. 1 to 5.

Prior to description about the cell-based IC layout system 100, brief description will be first given to a design and manufacturing method of the cell-based IC with reference to FIG. 1.

In the following description, a cell-based IC refers to an integrated circuit including desired circuit blocks constructed by any combinations of various types of basic cells in which semiconductor devices are formed.

As shown in FIG. 1, the design and manufacture method of the cell-based IC includes a design process (Step S10) performed using the cell-based IC layout system 100, a layout data (CAD (Computer Aided Design) data) output process (Step S11), a process (Step S12) of preparing a photo mask based on output layout data, a wafer manufacturing process (Step S13) of manufacturing a wafer as a semiconductor substrate, a pre-process (wafer process) (Step S14) of preparing semiconductor devices in the wafer, and a post-process (Step S15) of assembling the semiconductor devices into a final product.

The pre-process includes a film forming process (Step S141) such as forming an oxide film or the like on the wafer, a process (Step S142) of transferring a layout pattern using the photo mask, a dry etching process (Step S143) of preparing a device structure corresponding to the layout pattern using plasma etching, reactive ion etching (RIE) process or the like.

The post-process includes a mounting process (Step S151) of performing dicing, die bonding, lead bonding, resin sealing of the wafer into which semiconductor devices are incorporated, and so on, and a test process (Step S152) of checking a finished cell-based IC.

As described above, the cell-based IC layout system 100 according to the embodiment performs the design process (Step S10) and the layout data output process (Step S11).

Subsequently, a configuration of the cell-based IC layout system 100 according to the embodiment will be described with reference to FIG. 2 which shows a functional block diagram of the cell-based IC layout system 100.

The cell-based IC layout system 100 is a layout system which performs a cell-based IC layout design using an information processing apparatus 200 implemented with a computer such as a personal computer, a workstation or the like.

Specifically, the information processing apparatus 200 includes an unused region extracting unit 201 for extracting an unused region not occupied by basic cells in the cell-based IC under layout design, an insertion number calculating unit 202 for calculating the number of first decoupling capacitors, each consisting of only a p-MOS transistor and second decoupling capacitors, each consisting of a two-layered metal layer, which can be inserted in the unused region, and a decoupling capacitor cell inserting unit 203 for inserting a decoupling capacitor cell constituted by the first and second decoupling capacitors in the unused region based on the calculated number.

In addition, each of the units may be implemented with software executable by the information processing apparatus 200.

The cell-based IC layout system 100 further includes an input device 300 including a pointing device such as a keyboard, a mouse or the like for input of various setting values, instructions and so on, and a display apparatus 400 including a liquid crystal display monitor or the like.

The cell-based IC layout system 100 further includes a layout data output unit 500 for outputting layout data (CAD data) to an external photo mask preparation apparatus 600 after the layout design is completed.

Decoupling Capacitor Cell

A decoupling capacitor cell 1 constituted by a first decoupling capacitor 20 and a second decoupling capacitor 30 will now be described with reference to FIGS. 3 to 7.

Figure 3:
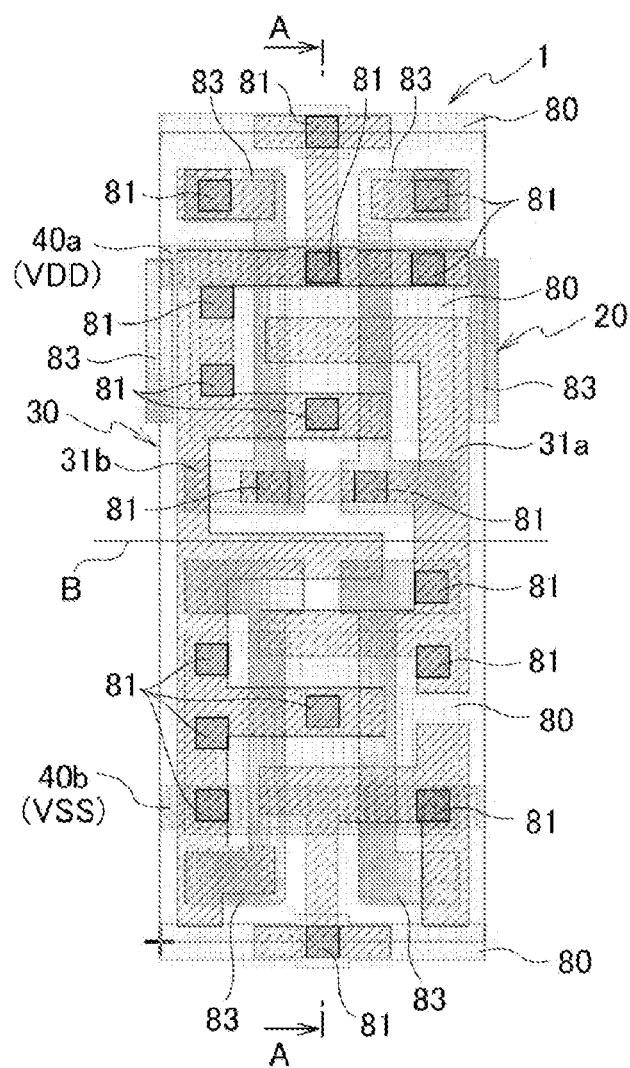
FIG. 3 is a plan view showing a configuration of a decoupling capacitor cell.

As shown in FIG. 3, the decoupling capacitor cell 1 according to the embodiment includes the first decoupling capacitor 20 consisting of only a p-MOS transistor (p-channel MOSFET) and the second decoupling capacitor 30 consisting of a two-layered metal layer. The decoupling capacitor cell 1 is arranged in an unused region 150 (See FIG. 11) not occupied by a basic cell 103 in a cell-based IC 101 and is connected to a power wiring 40a (VDD) and a ground wiring 40b (VSS).

In FIG. 3, reference numeral 80 denotes an active region formed of a diffusion layer, reference numeral 81 denotes a contact, and reference numeral 83 denotes a polysilicon gate.

Figure 4:
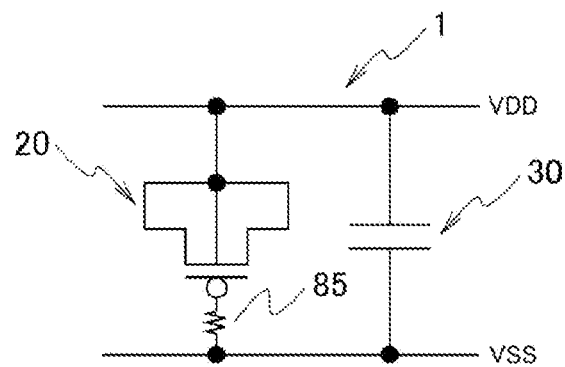
FIG. 4 is a circuit diagram of the decoupling capacitor cell.

As shown in FIG. 4, the first decoupling capacitor 20 and the second decoupling capacitor 30 are connected in parallel between the power wiring VDD and the ground wiring VSS.

As shown in FIG. 4, the first decoupling capacitor 20 is connected to the ground wiring VSS via a limiting resistor 85 constituted by an active jumper. The limiting resistor 85 is provided to prevent a gate oxide film of the p-MOS transistor (p-channel MOSFET) constituting the first decoupling capacitor 20 from being damaged due to surge current of ESD (Electro-Static Discharge). A microscopic structure of the limiting resistor 85 is not shown in FIG. 3.

Figure 5:
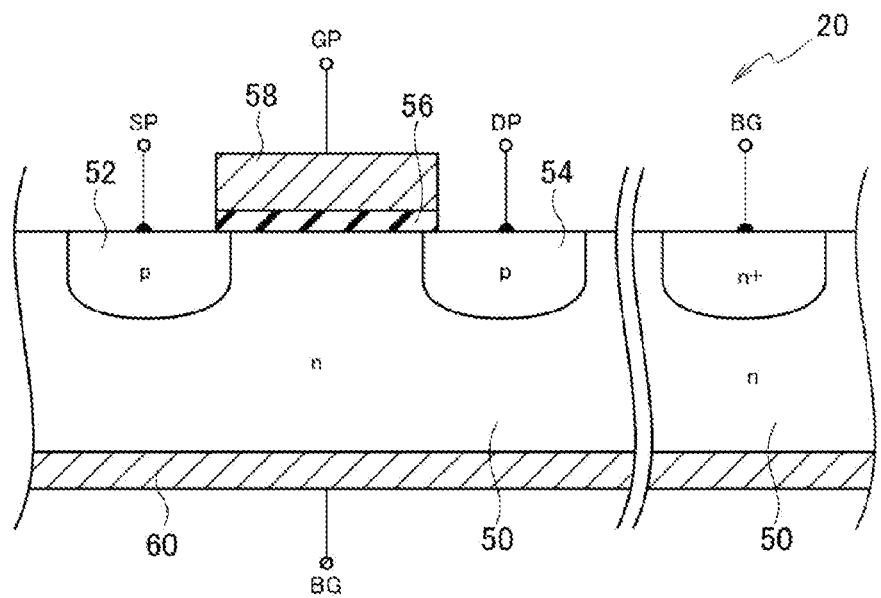
FIG. 5 is a schematic sectional view of a p-channel MOSFET (Metal Oxide Semiconductor Field Effect Transistor) constituting a first decoupling capacitor.

As shown in FIG. 5, the p-channel MOSFET constituting the first decoupling capacitor 20 includes a source region 52 and a drain region 54 formed on an n type semiconductor layer 50, a gate insulating film 56 formed on the n type semiconductor layer 50, a gate electrode 58 formed on the gate insulating film 56, and a back gate electrode 60 formed on a rear surface of the n type semiconductor layer 50. A source wiring SP, a drain wiring DP, a gate wiring GP and a back gate wiring BG are connected to the source region 52, the drain region 54, the gate electrode 58 and the back gate electrode 60, respectively.

Figure 6:
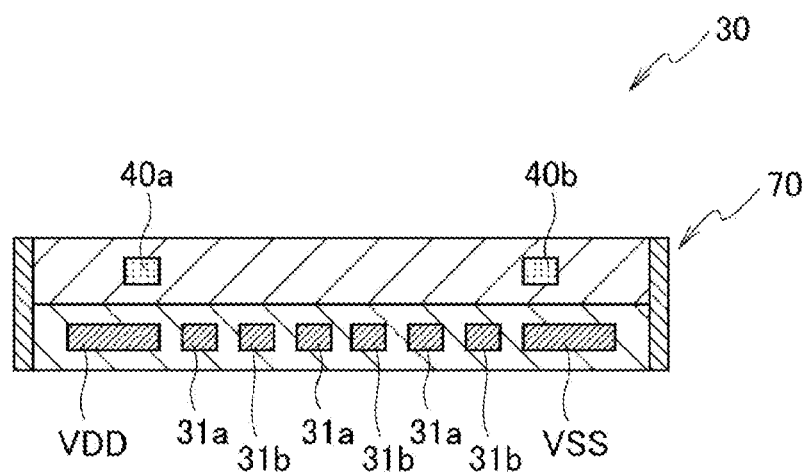
FIG. 6 is a sectional view taken along line A-A in FIG. 3.

As shown in FIG. 6, the second decoupling capacitor 30 includes decoupling capacitor members 31a and 31b, each of which is constituted by a first layer of metal formed on a semiconductor substrate 70 and extends in a plane direction of the semiconductor substrate 70, and power rails 40a and 40b, each being constituted by a second layer of metal formed on the semiconductor substrate 70, which face a portion of the decoupling capacitor members 31a and 31b and form the power wiring VDD and the ground wiring VSS, respectively.

Figure 7:
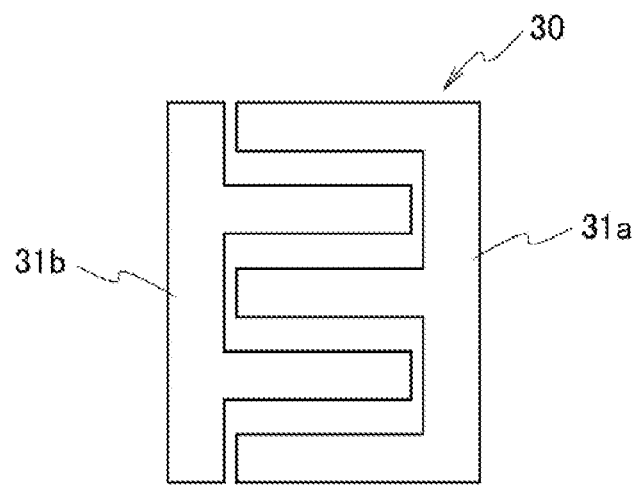
FIG. 7 is a plan view showing a configuration of decoupling capacitor members constituting a second decoupling capacitor.

In the example shown in FIG. 7, the decoupling capacitor members 31a and 31b are provided in the form of a comb tooth having a plurality of unevenness formed in a horizontal direction of FIG. 7. Other configurations of the decoupling capacitor members 31a and 31b will be described later.

Figure 8:
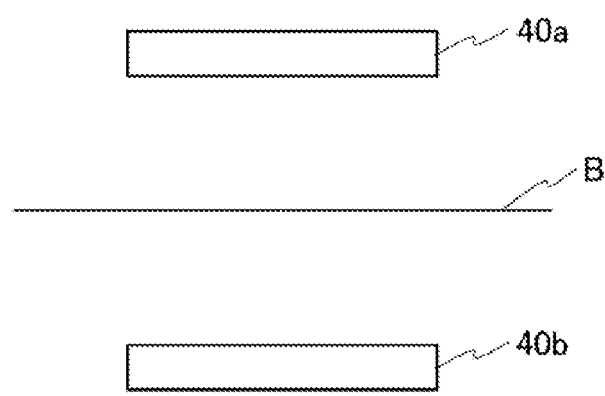
FIG. 8 is a plan view showing a configuration of a power rail.

As shown in FIGS. 3 and 8, two power rails 40a and 40b are formed for each decoupling capacitor cell 1 and are disposed in parallel.

In addition, as shown in FIGS. 3 and 8, the power rails 40a and 40b are disposed to be symmetrical with respect to a center line B.

Comparative Example

Figure 9:
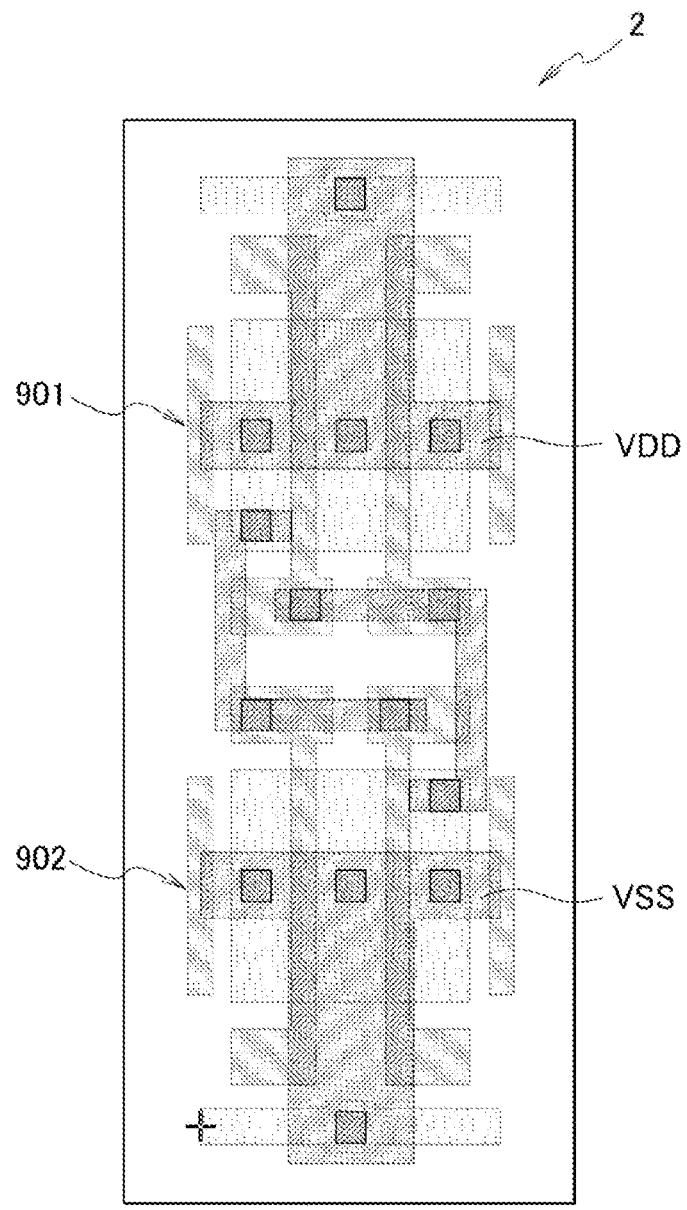
FIG. 9 is a plan view showing a decoupling capacitor as a comparative example.

FIG. 9 shows a comparative example of a decoupling capacitor cell.

In the comparative example, a decoupling MOS capacitor cell 2 including a pair of nMOS transistor 901 and pMOS transistor 902 is used. The decoupling capacitor cell 2 is connected between the power wiring VDD and the ground wiring VSS.

However, the fining process performed on a gate oxide may result in the thinness of the gate oxide film, which in turn causes insulation of a gate oxide film to be insufficient. Also, this may cause the increase in leak current and thus the increase in power consumption. In particular, the decoupling MOS capacitor cell 2 including the nMOS transistor 901 has leak current which is about ten times as high as that in the decoupling MOS capacitor cell 1 including only the pMOS transistor (See FIG. 3).

The decoupling capacitor cell 1 according to the embodiment in FIG. 3 allows the leak current to be reduced to about $\frac{1}{10}$.

In addition, in the comparative example, since the power wiring VDD and the ground wiring VSS are wired in the first layer, sufficient decoupling metal capacity may not be obtained in a limited cell region. In contrast, the second decoupling capacitor 30 according to the embodiment in FIG. 3 can secure sufficient decoupling metal capacity since the power wiring VDD and the ground wiring VSS are constituted by the power rails 40a and 40b formed by the second layer of metal and the decoupling capacitor members 31a and 31b are constituted by the first layer of metal.

Extraction of Unused Region and Insertion of Decoupling Capacitor Cell

Extraction of an unused region not occupied by a basic cell in the cell-based IC 101 under layout design and insertion of a decoupling capacitor cell will be described with reference to FIGS. 10 to 12.

The cell-based IC is a user-demanded IC implemented by a combination of required cells selected from a standardized cell library commonly used in various ICs.

This library includes, for example, small-scaled logic circuits such as NAND, NOR and the like, large-scaled logic circuits such as ALU and the like, analog circuits such as an AD converter, a comparator and the like, and so on.

Figure 10:
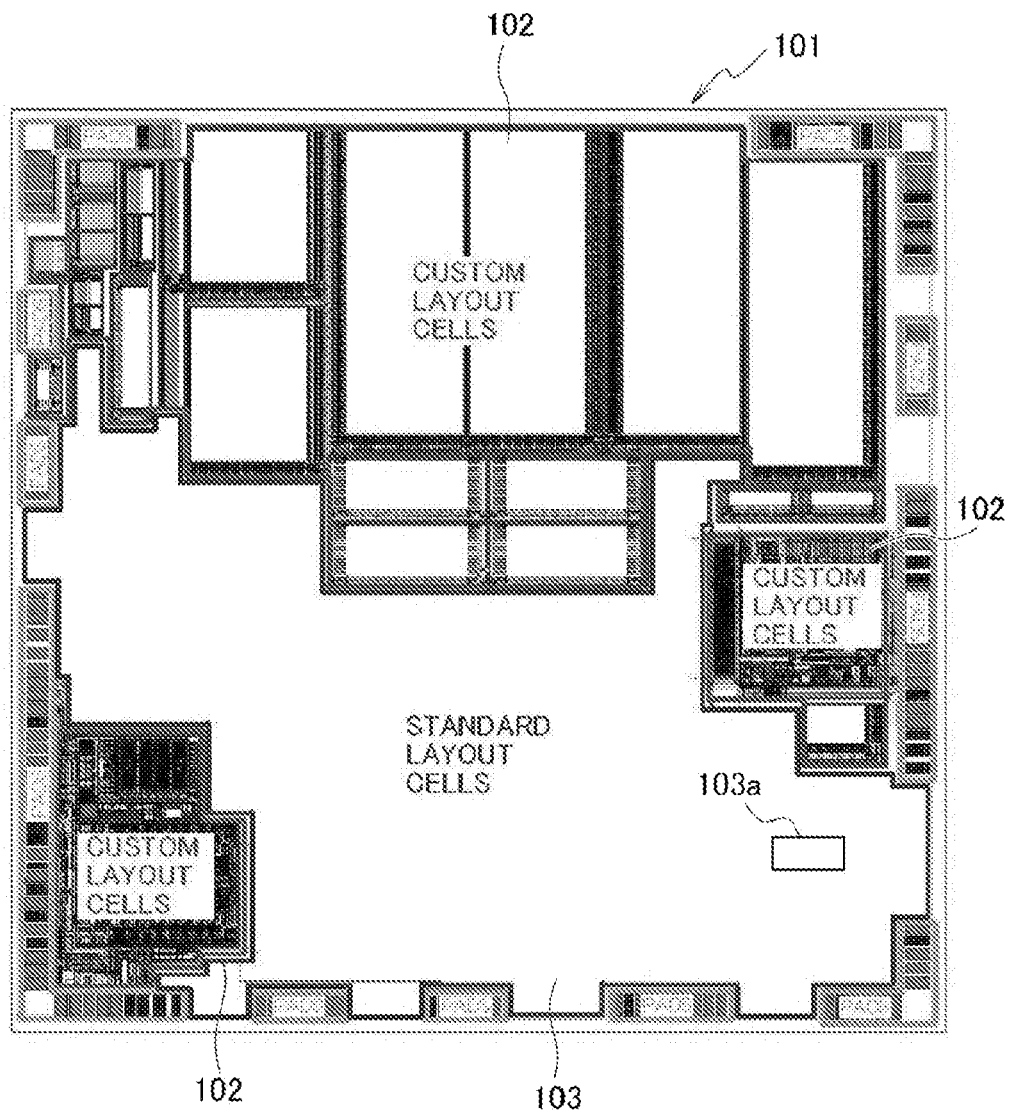
FIG. 10 is a plan view showing a configuration of a cell-based IC under layout design.

As shown in FIG. 10, the cell-based IC 101 according to the embodiment includes a functional block constructed by a combination of custom layout cells 102 customized to users and basic standard layout cells 103 having the minimum function constituting a logic circuit.

Each of the basic cells 103 includes a set of gate cells constructing circuits such as, an inverter, NAND, NOR, a flip-flop circuit, a complex circuit, a gate, a buffer and so on.

Figure 11:
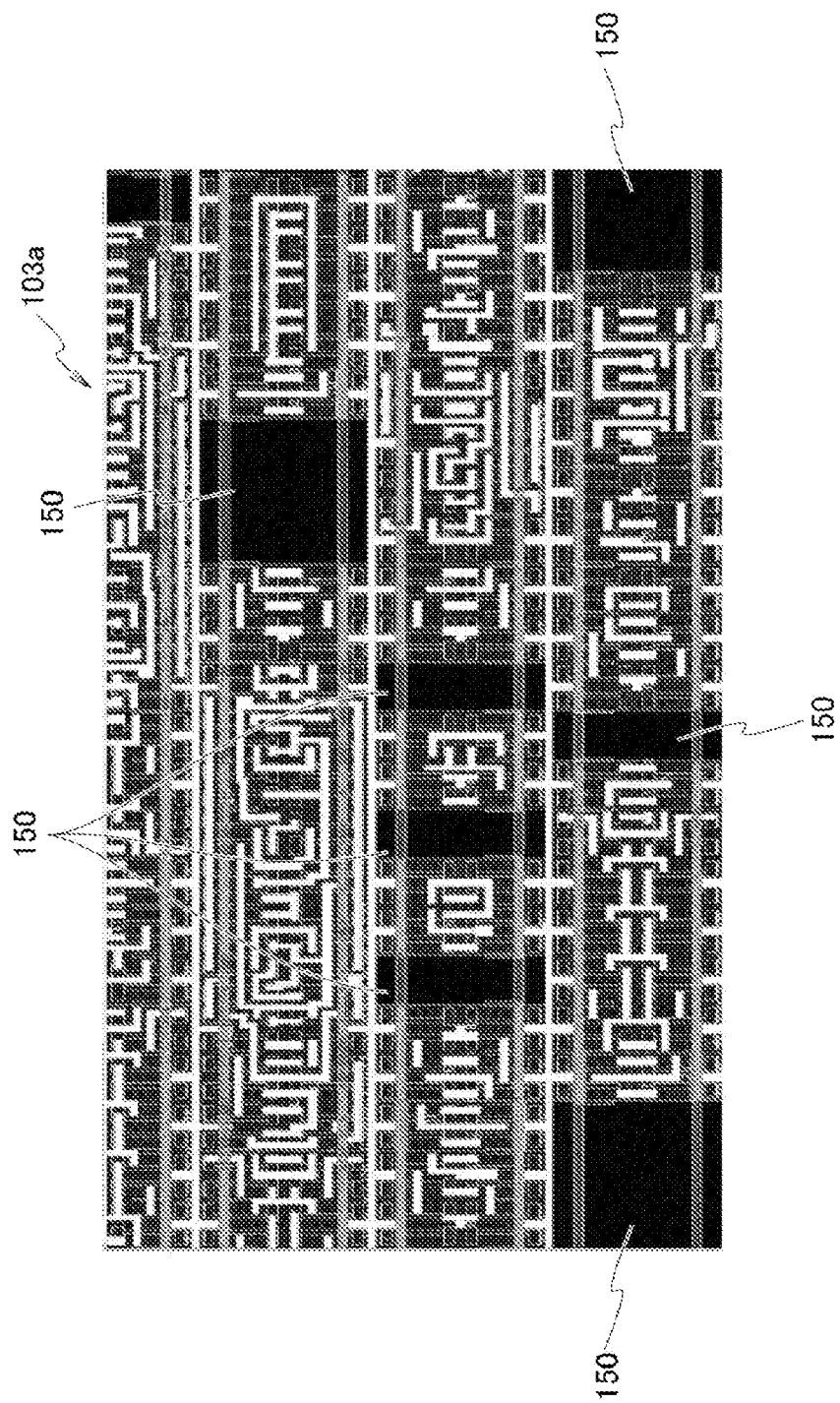
FIG. 11 is an enlarged view showing a portion of a basic cell including an unused region.

FIG. 11 shows an enlarged partial region 103a of the basic cells 103 of the cell-based IC 101 under layout design in the cell-based IC layout system 100.

An unused region 150 as shown in FIG. 11 is extracted by a calculation process performed by the unused region extracting unit 201 of the layout system 100.

Subsequently, the number of decoupling capacitor cells 1 which can be inserted in the unused region 150 is calculated by the insertion number calculating unit 202.

Subsequently, based on the calculated number, the first decoupling capacitor 20 and the second decoupling capacitor 30 are inserted in the unused region 150 by the decoupling capacitor cell inserting unit 203 (see FIG. 12).

Figure 12:
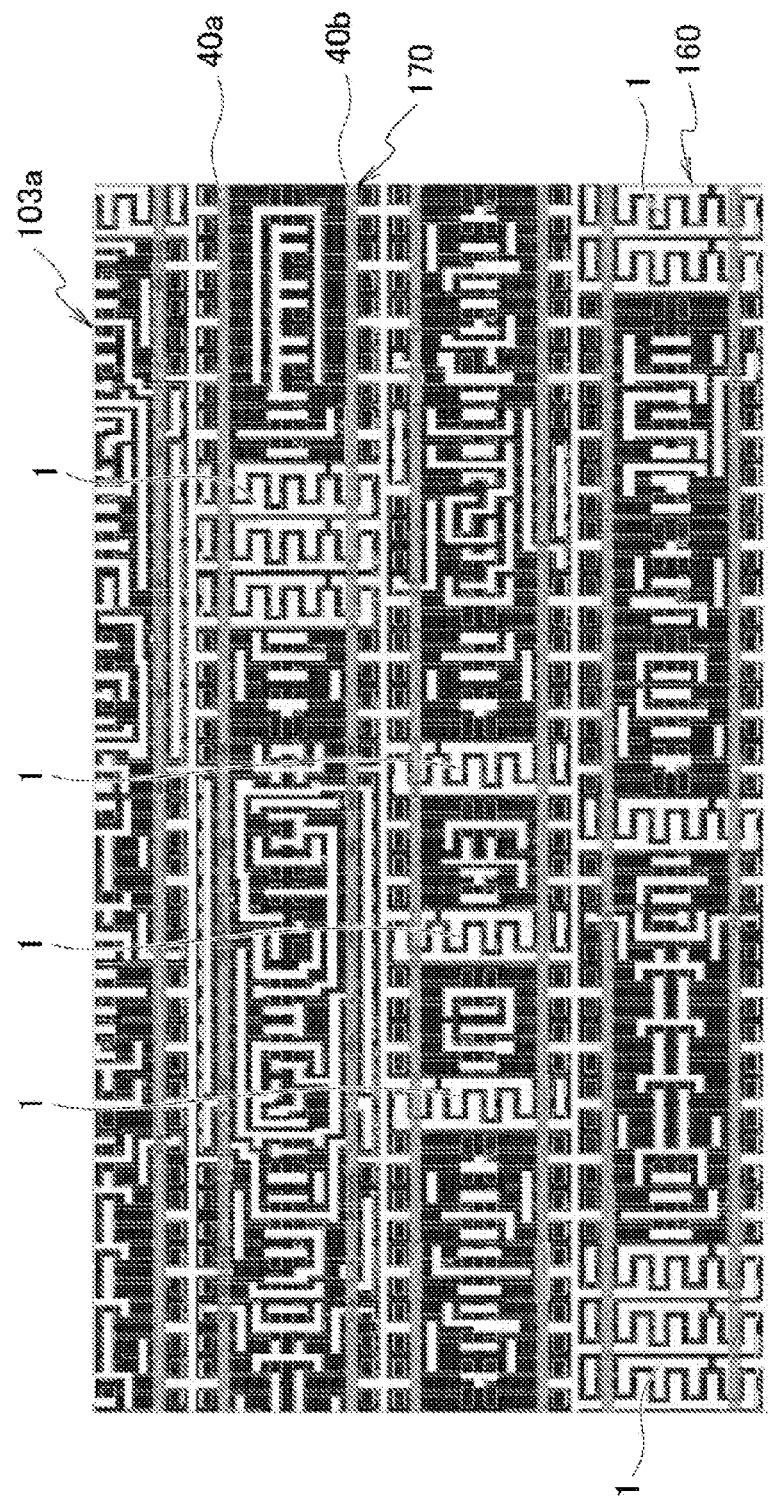
FIG. 12 is an enlarged view showing a state where a decoupling capacitor cell is inserted in the unused region.

In addition, the decoupling capacitor members 31a and 31b of the decoupling capacitor cell 1 shown in FIG. 12 are constituted by a first layer metal 160 and the power rails 40a and 40b of the decoupling capacitor cell 1 are constituted by a second layer metal 170.

In addition, the process of extracting the unused region, the process of calculating the number of insertable decoupling capacitors, and the process of inserting the decoupling capacitors may be performed by operation of the input device 300 by an operator to instruct the cell-based IC layout system 100 or may be automatically performed by the layout system 100 according to a preset program.

Decoupling Capacitor Cell Insertion Process

Figure 13:
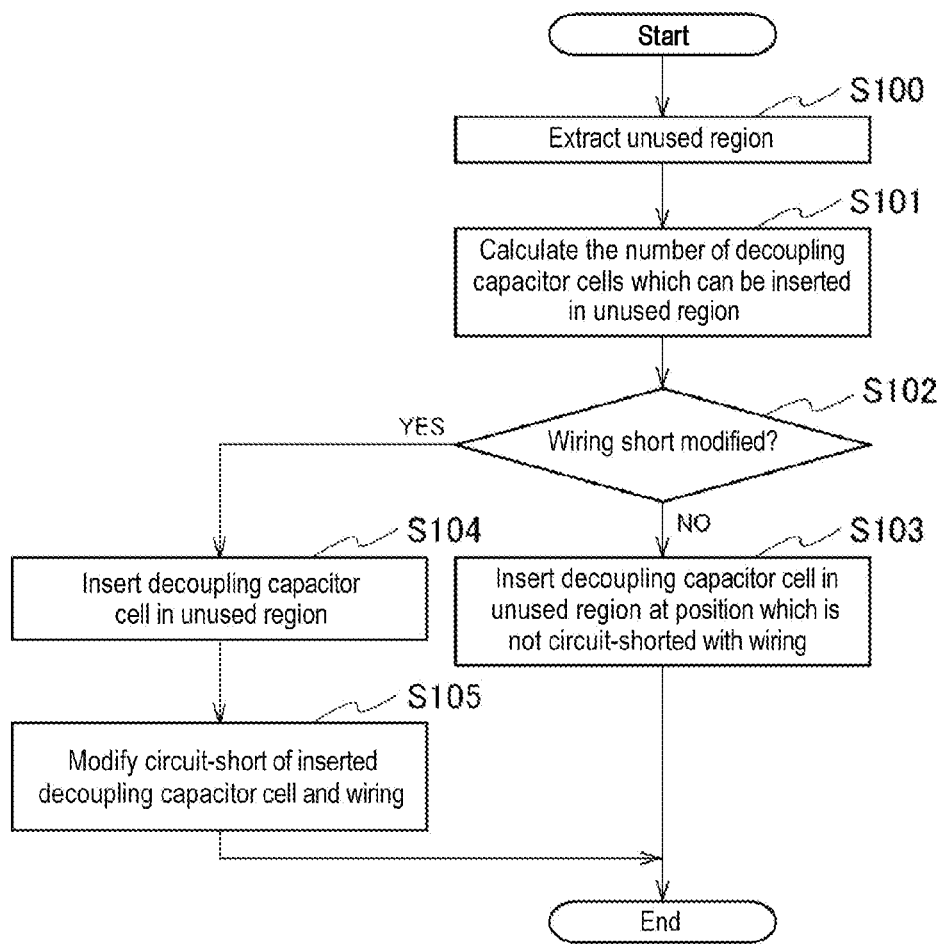
FIG. 13 is a flow chart showing a decoupling capacitor cell inserting process performed by a cell-based IC layout system.

A decoupling capacitor cell insertion process performed by the cell-based IC layout system 100 will now be described with reference to a flow chart of FIG. 13.

When the decoupling capacitor cell insertion process starts, the unused region 150 not occupied by a basic cell is first extracted at Step S100, and then the process proceeds to Step S101.

In Step S101, the number of decoupling capacitor cells 1 that can be inserted in the unused region 150 is calculated, and then the process proceeds to Step S102.

In Step S102, the process checks whether wiring short is modified. If wiring short is not modified ("No" in S102), the process proceeds to Step S103.

At Step S103, the decoupling capacitor cell 1 is inserted in the unused region 150 at a position where the decoupling capacitor cell 1 is not short circuited with the wiring. The process ends.

Otherwise, if wiring short is modified ("Yes" in S102), the process proceeds to Step S104 where the decoupling capacitor cell 1 is inserted in the unused region 150, and then the process proceeds to Step S105.

At Step S105, short circuit of the inserted decoupling capacitor cell 1 and the wiring are modified, and then the process ends.

As apparent from the above, the decoupling capacitor cell 1 can be inserted in the unused region 150 with avoidance of short circuit with the wiring.

Modification of Decoupling Capacitor Cell

Modification examples of the decoupling capacitor cell 1 will now be described with reference to FIGS. 14 to 17.

Figure 14:
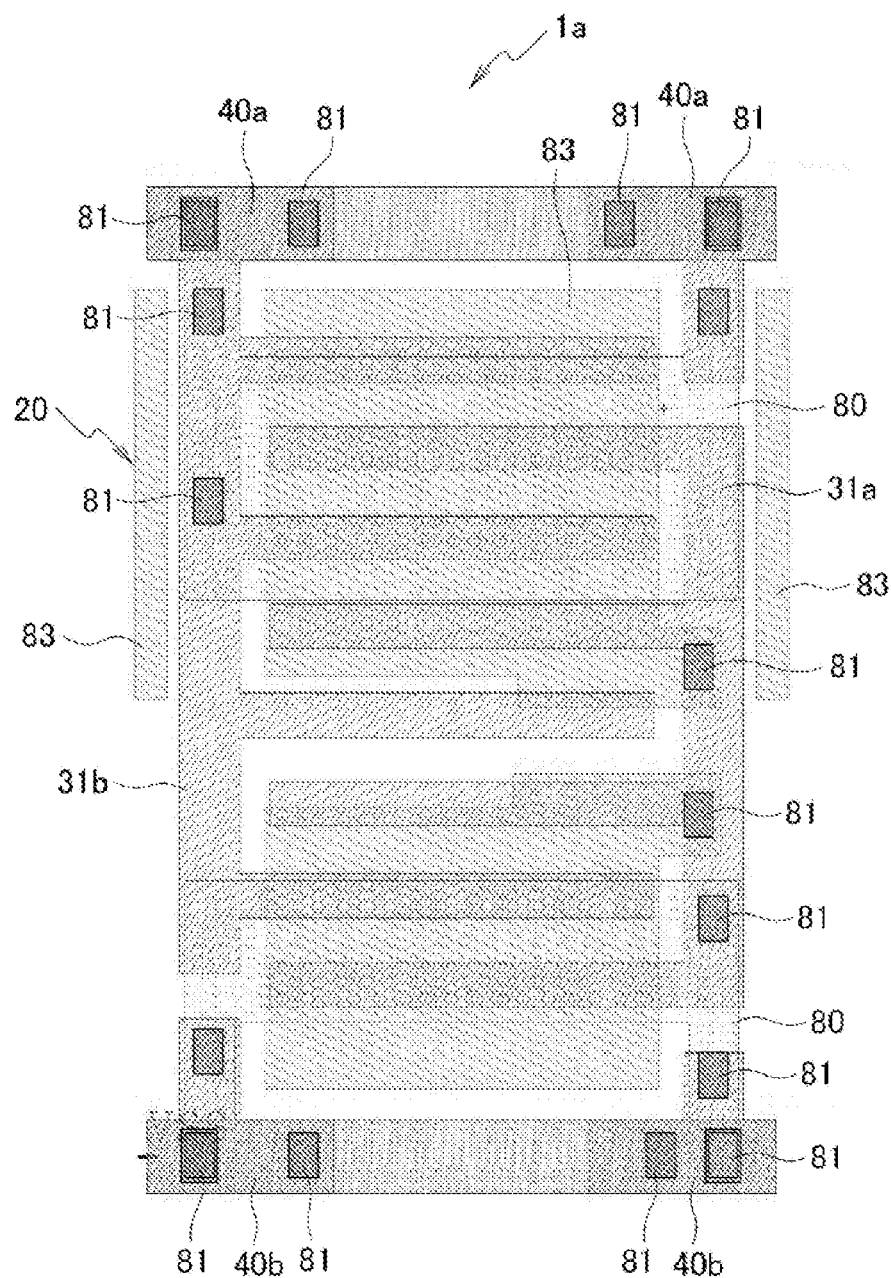
FIG. 14 is a plan view showing a modification example of the decoupling capacitor cells.

A decoupling capacitor cell 1a shown in FIG. 14 is a standard decoupling capacitor cell replacing a gate array.

The decoupling capacitor cell 1a has the same configuration as the decoupling capacitor cell 1 constituted by the gate array shown in FIG. 3. Detailed explanation of the same reference numerals is not repeated.

Figure 15:
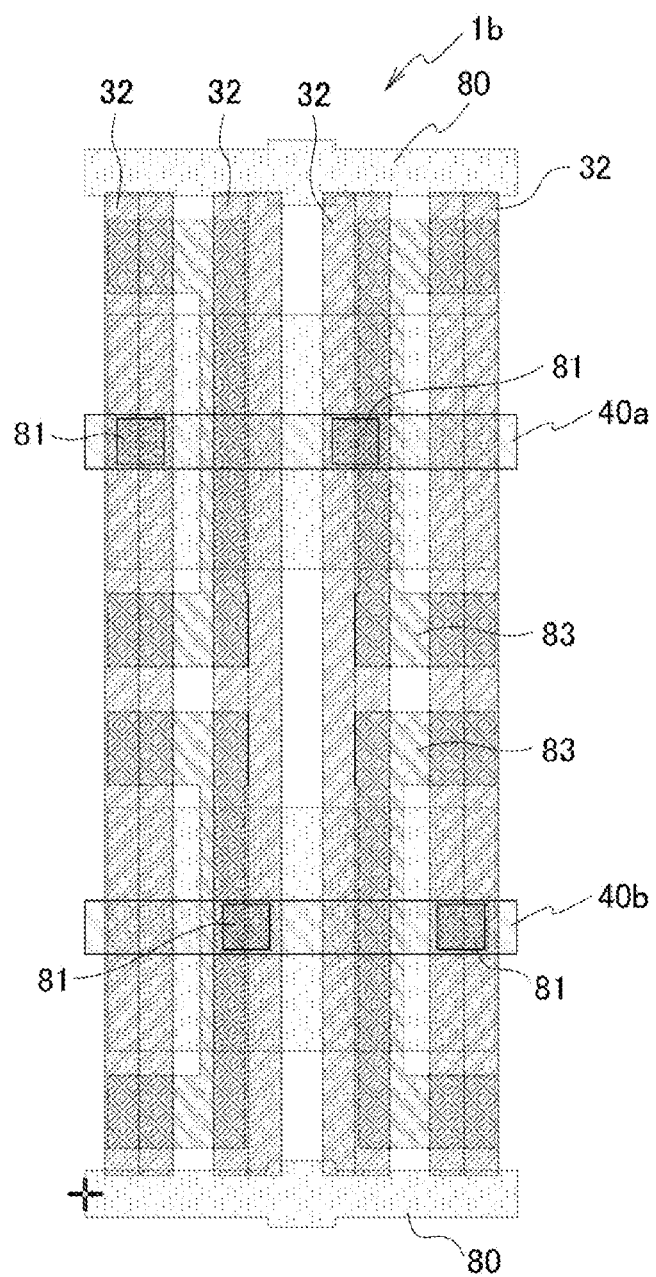
FIG. 15 is a plan view showing another modification example of the decoupling capacitor cells.

A decoupling capacitor cell 1b shown in FIG. 15 includes a strip-like decoupling capacitor member 32.

This configuration can secure sufficient capacitance of a decoupling capacitor.

Figure 16:
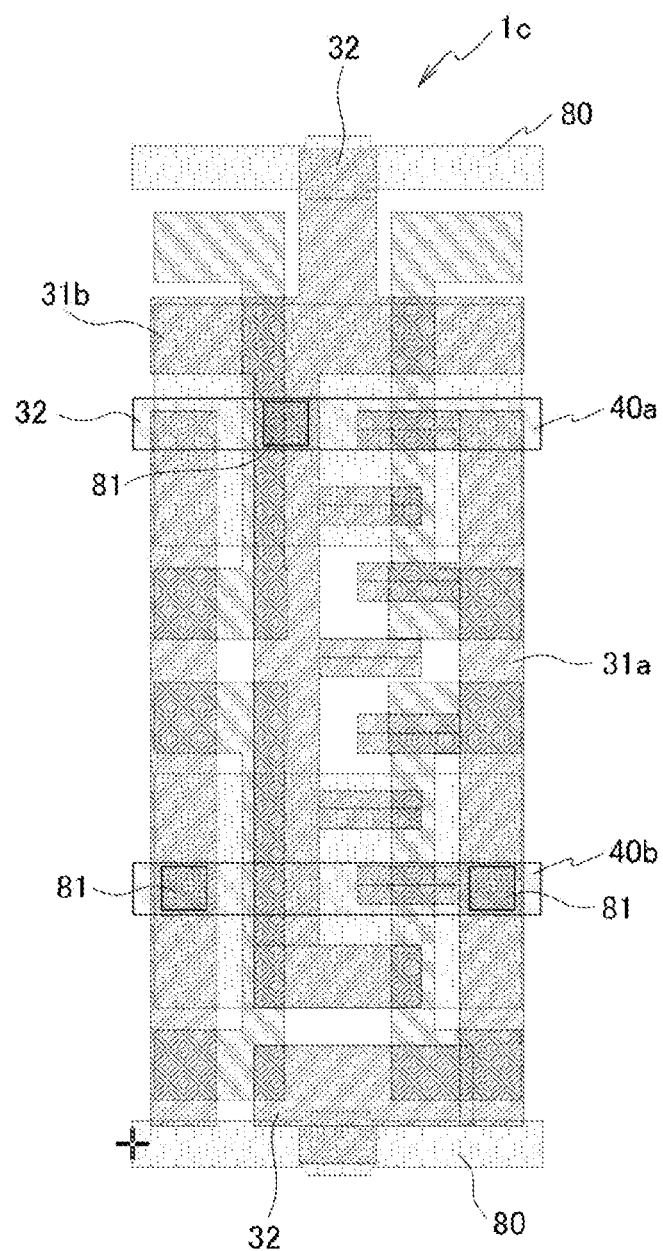
FIG. 16 is a plan view showing another modification example of the decoupling capacitor cells.

A decoupling capacitor cell 1c shown in FIG. 16 is constituted by a combination of comb tooth-like decoupling capacitor members 31a and 31b having a plurality of unevenness formed in the plane direction and strip-like decoupling capacitor members 32.

This configuration can secure more sufficient capacitance of a decoupling capacitor.

Figure 17:
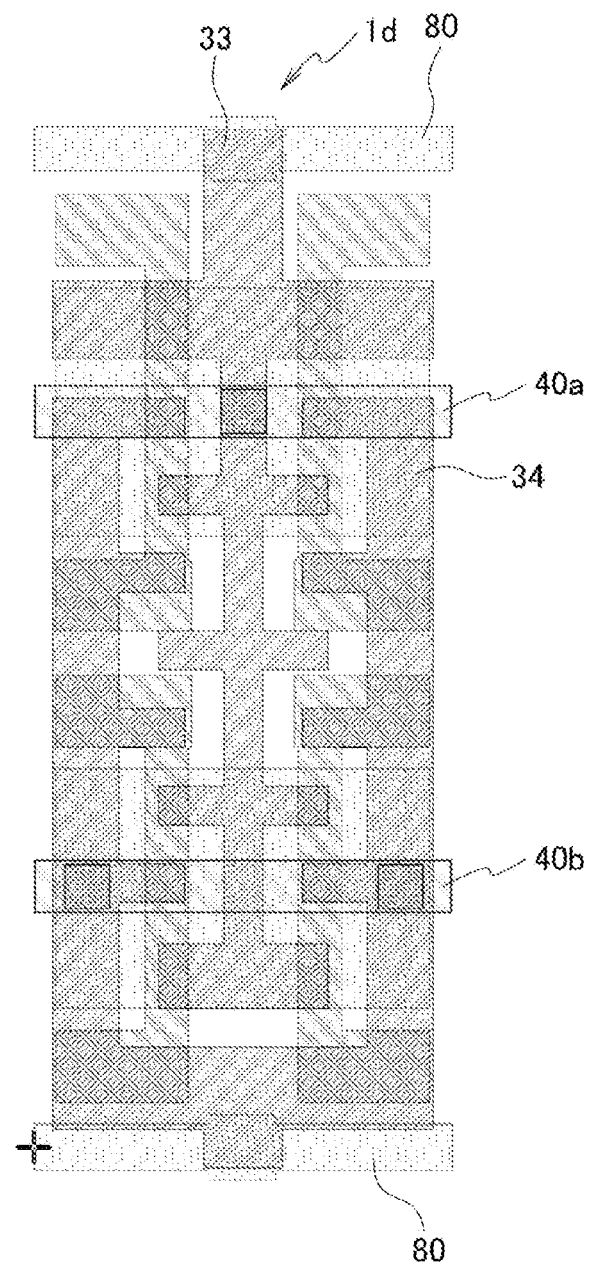
FIG. 17 is a plan view showing another modification example of the decoupling capacitor cells.

A decoupling capacitor cell 1d shown in FIG. 17 includes a fishbone-like decoupling capacitor member 33d having a plurality of unevenness formed in the plane direction.

In addition, in the modification example shown in FIG. 17, decoupling capacitor members 34 are provided to surround the fishbone-like decoupling capacitor member 33d.

This configuration can secure more sufficient capacitance of a decoupling capacitor.

As described above, the cell-based IC 101, the cell-based IC layout system 100 and the layout method can save power and reduce ground noises while restricting power consumption.

Cell-Based IC

The cell-based IC 101 layout designed by the above-described cell-based IC layout system 100 will now be described with reference to FIGS. 1 to 3 and 10 to 12.

Figure 2:
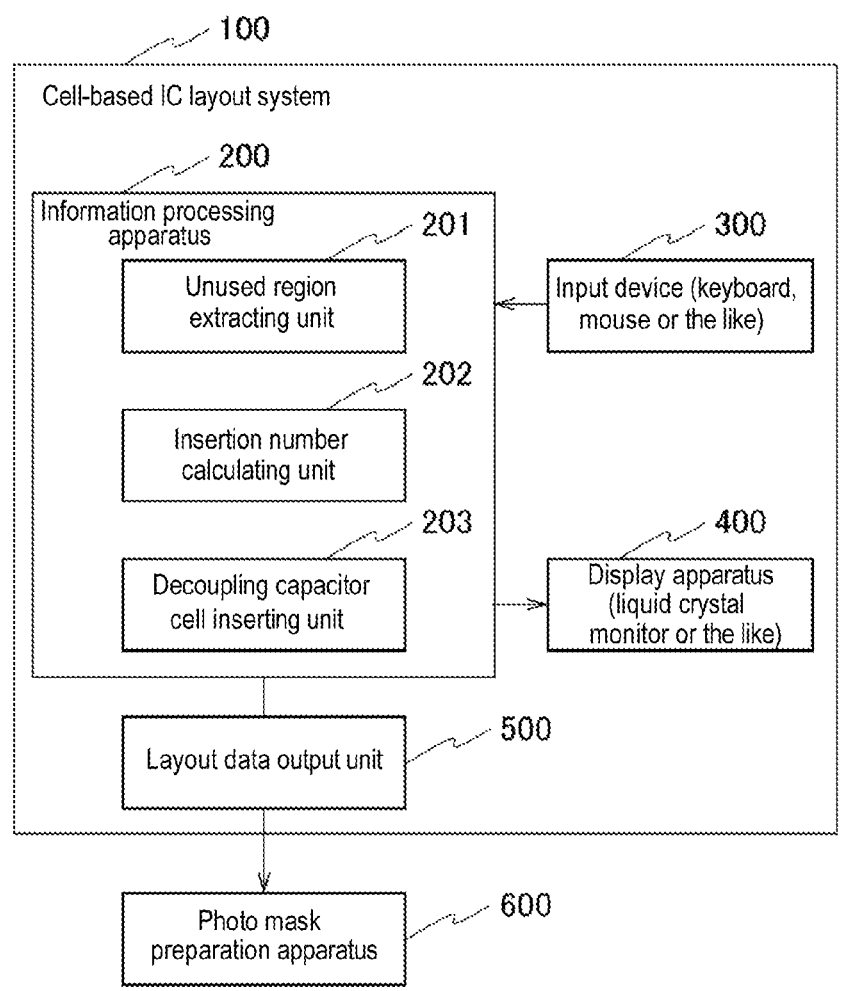
FIG. 2 is a functional block diagram of a cell-based IC layout system according to an embodiment.

As shown in FIG. 2, layout data (CAD data) layout designed by the cell-based IC layout system 100 are output to the external photo mask preparation apparatus 600 via the layout data output unit 500.

Then, a photo mask (not shown) is prepared by the photo mask preparing process in Step S12 shown in FIG. 1.

Subsequently, the cell-based IC 101 is completed through the pre-process (wafer process) of Step S14 and the post-process of Step S15 for the semiconductor substrate manufactured in Step S13.

The completed cell-based IC 101 has the configuration layout designed by the cell-based IC layout system 100.

Specifically, the cell-based IC 101 includes a semiconductor substrate, a plurality of basic cells 103 which is formed on the semiconductor substrate to have a plurality of semiconductor devices and internal wirings, and a predetermined function provided by connecting the semiconductor devices using the internal wirings, a wiring region formed on the semiconductor substrate and has an external wiring to connect the basic cells 103, a ground wiring and a power wiring supplying power to the semiconductor devices, a first decoupling capacitor 20 (see FIG. 3 and so on) formed by only a pMOS transistor on the semiconductor substrate, and a second decoupling capacitor 30 (see FIG. 3 and so on) constituted by two metal layers formed on the semiconductor substrate. The decoupling capacitor cell 1 (see FIG. 3 and so on) formed by the first and second decoupling capacitors 20 and 30 is disposed in an unused region 150 (see FIG. 11) which is not occupied by the basic cells 103, and is connected to the power wiring 40a and the ground wiring 40b (see FIG. 3 and so on).

With this configuration, the cell-based IC 101 can save power and reduce ground noises while restricting power consumption.

Figure 18:
FIG. 18 is an illustration of a portable device in which the cell-based ICs may be installed, according to some embodiments of the present disclosure.

FIG. 18 is an illustration of a portable device to which the cell-based ICs may be applied according to some embodiments of the present disclosure. FIG. 18 is intended for illustrate an example portable device such as a smartphone, in which one or more cell-based ICs implemented according to the above embodiments may be installed at any suitable positions for being coupled to any other suitable components in the portable device. In general, the portable device described herein is indicative of various types of devices, such as a wireless phone, a cellular phone, a laptop computer, a wireless multimedia device, a wireless communication personal computer (PC) card, a PDA, an external or internal modem, a device that communicates through a wireless channel, and so on. A device may have various names, such as access terminal (AT), access unit, subscriber unit, mobile station, client device, mobile unit, mobile phone, mobile, remote station, remote terminal, remote unit, user device, user equipment, handheld device, etc. Any device described herein may have a memory for storing instructions and data, as well as hardware, software, firmware, or combinations thereof Other Embodiments Although the present disclosure has been described in the above by ways of the first to third embodiments, it is to be understood that the description and drawings constituting parts of the present disclosure are merely illustrative but not limitative. Various alternative embodiments, examples and operation techniques will be apparent to those skilled in the art when reading from the above description and the drawings.

INDUSTRIAL APPLICABILITY

The decoupling capacitor, the cell-based IC, the cell-based IC layout system and the layout method according to the present disclosure can be applied to layout designs for ASICs and so on.

According to the present disclosure in some embodiments, it is possible to provide a decoupling capacitor cell, a cell-based IC, a cell-based IC layout system and a layout method, which are capable of saving power and reducing ground noises while restricting power consumption.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A decoupling capacitor cell comprising:
a first decoupling capacitor formed by only a pMOS transistor; and
a second decoupling capacitor formed by two metal layers,
wherein the decoupling capacitor cell is arranged in an unused region not occupied by basic cells in a cell-based IC and is connected to a power wiring and a ground wiring.

2. A cell-based IC comprising:
a semiconductor substrate;
a plurality of basic cells which is formed on the semiconductor substrate to have a plurality of semiconductor devices and internal wirings, and has a predetermined function provided by connecting the semiconductor devices using the internal wirings;
a wiring region which is formed on the semiconductor substrate and has an external wiring to connect the basic cells;
a ground wiring and a power wiring configured to supply power to the semiconductor devices;
a first decoupling capacitor which is formed by only a pMOS transistor on the semiconductor substrate; and
a second decoupling capacitor which is constituted by two metal layers formed on the semiconductor substrate,
wherein a decoupling capacitor cell which is formed by the first and second decoupling capacitors is disposed in an unused region which is not occupied by the basic cells, and is connected to the power wiring and the ground wiring.

3. The cell-based IC of claim 2, wherein the second decoupling capacitor includes:
decoupling capacitor members which are constituted by a first layer of metal formed on the semiconductor substrate and extends in a plane direction parallel to the semiconductor substrate; and
a power rail including the power wiring and the ground wiring,
wherein the power rail is constituted by a second layer of metal formed on the semiconductor substrate to face a portion of the decoupling capacitor member.

4. The cell-based IC of claim 3, wherein the power wiring and the ground wiring of the power rail for the decoupling capacitor cell are disposed in parallel to each other.

5. The cell-based IC of claim 3, wherein the decoupling capacitor members have a form of a comb tooth having a plurality of unevenness formed in the plane direction.

6. The cell-based IC of claim 3, wherein the decoupling capacitor members have a form of a strip.

7. The cell-based IC of claim 3, wherein the decoupling capacitor members are constituted by a combination of a form of a comb tooth having a plurality of unevenness formed in the plane direction and a form of a strip.

8. The cell-based IC of claim 3, wherein the decoupling capacitor members have a form of a fishbone having a plurality of unevenness formed in the plane direction.

9. The cell-based IC of claim 2, wherein the first decoupling capacitor and the second decoupling capacitor are connected in parallel between the power wiring and the ground wiring.

10. A portable device comprising a cell-based IC of claim 2.

* * * * *